United States Patent
Petri

(10) Patent No.: US 10,372,792 B2
(45) Date of Patent: *Aug. 6, 2019

(54) DOCUMENT TRANSFORMATION PERFORMANCE VIA INCREMENTAL FRAGMENT TRANSFORMATIONS

(71) Applicant: International Business Machines Corporation, Armonk, NY (US)

(72) Inventor: John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,640

(22) Filed: Nov. 16, 2017

(65) Prior Publication Data
US 2018/0075001 A1    Mar. 15, 2018

Related U.S. Application Data

(63) Continuation of application No. 11/681,926, filed on Mar. 5, 2007.

(51) Int. Cl.
*G06F 17/22* (2006.01)

(52) U.S. Cl.
CPC ........ *G06F 17/2229* (2013.01); *G06F 17/227* (2013.01); *G06F 17/2247* (2013.01); *G06F 17/2264* (2013.01)

(58) Field of Classification Search
CPC .................................................. G06F 17/2229
See application file for complete search history.

(56) References Cited

U.S. PATENT DOCUMENTS

| | | | | |
|---|---|---|---|---|
| 6,848,079 B2* | 1/2005 | Ito | ........................ | G06F 17/2264 707/999.202 |
| 6,996,781 B1* | 2/2006 | Myers | ................. | G06F 17/2247 715/236 |
| 7,140,536 B2* | 11/2006 | Barabe | ................ | G06F 17/2288 235/375 |
| 7,143,103 B1* | 11/2006 | Zisman | .................... | G06F 16/94 |
| 7,146,565 B2* | 12/2006 | Toyama | .............. | G06F 17/2247 715/239 |
| 7,155,670 B2 | 12/2006 | Takizawa et al. | | |
| 7,228,496 B2* | 6/2007 | Hamada | .................. | G06F 17/21 707/999.1 |

(Continued)

OTHER PUBLICATIONS

W3C Recommendation XSL Transformations (XSL T) Version 1.0; Editor:James Clark, Published on: Nov. 16, 1999, Retrieved on: Jun. 11, 2010, Available at: http://www.w3.org/TR/xslt, Attached as: W3C XSLT Specification.pdf, 94 pages.

*Primary Examiner* — Scott T Baderman
*Assistant Examiner* — Benjamin Smith
(74) *Attorney, Agent, or Firm* — Patterson + Sheridan, LLP

(57) ABSTRACT

A method and apparatus for improving the efficiency of document transformation processes is disclosed. For example, more efficient XML transformations may be performed against a source document that has incurred minor or incremental changes. Rather than apply a transform (e.g., an XSLT document) to a complete document each time any fragment of the source document is modified, a document management system may be configured to apply the transform only to the modified portions of the document.

21 Claims, 6 Drawing Sheets

(56) References Cited

U.S. PATENT DOCUMENTS

| | | | |
|---|---|---|---|
| 7,272,785 B2 * | 9/2007 | Fukuda | G06F 17/212 715/234 |
| 7,380,205 B2 * | 5/2008 | Bezrukov | G06F 17/2229 707/999.102 |
| 7,398,466 B2 * | 7/2008 | Jeon | G06F 17/2247 715/229 |
| 7,437,374 B2 * | 10/2008 | Chen | G06F 17/2229 |
| 7,496,837 B1 * | 2/2009 | Larcheveque | G06F 17/2247 715/234 |
| 7,523,221 B2 * | 4/2009 | Hillberg | G06F 16/116 709/246 |
| 7,543,024 B2 * | 6/2009 | Holstege | G06F 16/958 709/206 |
| 7,617,451 B2 * | 11/2009 | Jones | G06F 17/2229 715/200 |
| 7,711,702 B2 * | 5/2010 | Smolen | G06F 16/2308 707/715 |
| 7,721,193 B2 * | 5/2010 | Upton | G06F 9/541 715/234 |
| 7,805,341 B2 * | 9/2010 | Stromquist | G06Q 40/12 705/30 |
| 7,805,452 B2 * | 9/2010 | Kano | G06F 17/211 707/708 |
| 7,827,177 B2 * | 11/2010 | Murthy | G06F 16/83 707/736 |
| 7,937,398 B2 * | 5/2011 | Murthy | G06F 16/83 707/755 |
| 8,046,683 B2 | 10/2011 | Larcheveque et al. | |
| 8,108,768 B2 | 1/2012 | Petri | |
| 8,185,820 B1 * | 5/2012 | Good | G06F 17/248 715/234 |
| 8,321,457 B2 * | 11/2012 | Tan | G06F 8/61 707/779 |
| 8,661,507 B1 * | 2/2014 | Hesselink | H04L 63/0209 726/2 |
| 8,745,082 B2 * | 6/2014 | Cong | G06F 17/2229 707/770 |
| 9,183,321 B2 * | 11/2015 | Murthy | G06F 17/2247 |
| 9,880,980 B2 * | 1/2018 | Petri | G06F 17/227 |
| 2002/0023114 A1 * | 2/2002 | Ito | G06F 17/2264 715/234 |
| 2002/0156803 A1 * | 10/2002 | Maslov | G06F 17/2229 715/234 |
| 2003/0149935 A1 | 8/2003 | Takizawa et al. | |
| 2003/0177443 A1 * | 9/2003 | Schnelle | G06F 16/86 715/227 |
| 2003/0189593 A1 * | 10/2003 | Yarvin | G06F 16/9577 715/762 |
| 2004/0010755 A1 * | 1/2004 | Hamada | G06F 17/21 715/255 |
| 2004/0019853 A1 * | 1/2004 | Takizawa | G06F 17/245 715/239 |
| 2004/0044965 A1 * | 3/2004 | Toyama | G06F 17/2247 715/234 |
| 2004/0122831 A1 * | 6/2004 | Ha | G06F 17/2229 |
| 2004/0199876 A1 * | 10/2004 | Ethier | G06F 17/218 715/249 |
| 2004/0230576 A1 * | 11/2004 | Hillberg | G06F 16/116 |
| 2005/0041040 A1 * | 2/2005 | Fukuda | G06F 17/212 345/619 |
| 2005/0091581 A1 * | 4/2005 | Bezrukov | G06F 17/2229 715/205 |
| 2005/0120298 A1 * | 6/2005 | Petrujkic | G06F 17/2229 705/7.13 |
| 2005/0125395 A1 * | 6/2005 | Boettiger | G06F 16/951 |
| 2005/0149862 A1 * | 7/2005 | Weitzman | G06F 17/218 715/248 |
| 2005/0177543 A1 * | 8/2005 | Chen | G06F 17/2229 |
| 2005/0228728 A1 * | 10/2005 | Stromquist | G06F 9/44505 705/30 |
| 2005/0289446 A1 * | 12/2005 | Moncsko | G06F 16/9558 715/208 |
| 2006/0047620 A1 * | 3/2006 | Branson | G06F 16/10 |
| 2006/0095834 A1 * | 5/2006 | Jeon | G06F 17/2247 715/229 |
| 2006/0136821 A1 * | 6/2006 | Barabe | B06F 17/2288 715/205 |
| 2006/0143562 A1 * | 6/2006 | Seurig | G06F 17/2247 715/234 |
| 2007/0016614 A1 * | 1/2007 | Novy | G06F 17/2229 |
| 2007/0027887 A1 * | 2/2007 | Baldwin | G06F 17/279 |
| 2007/0028162 A1 * | 2/2007 | Griffin | G06F 16/958 715/235 |
| 2007/0050403 A1 * | 3/2007 | Dhairyawan | G06F 17/21 |
| 2007/0067371 A1 * | 3/2007 | Allan | G06F 16/288 |
| 2007/0130176 A1 * | 6/2007 | Kawabe | G06F 17/248 |
| 2007/0136662 A1 * | 6/2007 | Khaba | G06F 17/2229 715/202 |
| 2007/0150809 A1 * | 6/2007 | Yoshida | G06F 17/2229 715/235 |
| 2007/0156768 A1 * | 7/2007 | Harrington | G06F 17/2229 |
| 2007/0174486 A1 * | 7/2007 | Holstege | G06F 16/958 709/246 |
| 2007/0182990 A1 * | 8/2007 | Stephen | G06F 17/227 358/1.15 |
| 2007/0192716 A1 * | 8/2007 | Hamada | G06F 17/21 715/764 |
| 2008/0005194 A1 * | 1/2008 | Smolen | G06F 16/2308 |
| 2008/0005659 A1 * | 1/2008 | Fujimaki | G06F 17/2211 715/234 |
| 2008/0091693 A1 * | 4/2008 | Murthy | G06F 17/2247 |
| 2008/0091703 A1 * | 4/2008 | Murthy | G06F 16/83 |
| 2008/0140705 A1 * | 6/2008 | Luo | G06F 17/2247 |
| 2008/0141116 A1 * | 6/2008 | Mohan | G06F 16/958 715/236 |
| 2009/0043798 A1 * | 2/2009 | Tan | G06F 8/61 |
| 2009/0138790 A1 | 5/2009 | Larcheveque et al. | |
| 2010/0077295 A1 * | 3/2010 | Ichino | G06F 17/2241 715/235 |
| 2010/0199167 A1 * | 8/2010 | Uematsu | G06F 17/2247 715/234 |
| 2011/0047193 A1 * | 2/2011 | Murthy | G06F 16/83 707/812 |
| 2012/0079364 A1 * | 3/2012 | Agarwal | G06F 8/456 715/234 |
| 2016/0026731 A1 * | 1/2016 | Murthy | G06F 17/2247 707/694 |
| 2018/0075001 A1 * | 3/2018 | Petri | G06F 17/227 |

* cited by examiner

400

| FRAGMENT LINK TABLE FOR XML DOCUMENT ||| 
|---|---|---|
| FRAGMENT | RULE | RESULT |
| FRAGMENT A | RULE 1 | RESULT 1 |
| FRAGMENT B | RULE 1, RULE 2 | RESULT 1, RESULT 2 |
| FRAGMENT C | RULE 2 | RESULT 2 |
| FRAGMENT D | RULE 3 | RESULT 3 |

FIG. 4

DOCUMENT TRANSFORMATION PERFORMANCE VIA INCREMENTAL FRAGMENT TRANSFORMATIONS

CROSS-REFERENCE TO RELATED APPLICATIONS

This application is a continuation of co-pending U.S. patent application Ser. No. 11/681,926, filed Mar. 5, 2007. The aforementioned related patent application is herein incorporated by reference in its entirety.

BACKGROUND OF THE INVENTION

Field of the Invention

Embodiments of the invention are generally related to data processing, and more specifically to document transformations.

Description of the Related Art

XML (Extensible Markup Language) is a widely used standard for creating markup languages which describe the structure of data. Because of XML's ability to function across different systems or applications, XML is growing in popularity as the preferred format for authoring and publishing (e.g. for Web page authoring/publishing).

One benefit offered by XML is its ability to have "single source publishing" using XML stylesheet transformations (XSLT) that separate content from presentation. XSLT is a standard that uses XSL stylesheets to transform XML documents into other XML documents or documents in other formats. For example, different XSLTs may be used on the same XML source document to produce numerous result documents of varying type (e.g. HTML, PDF, etc.) and with varying content.

The ability to transform XML data using XSLTs has become widely accepted. However, the performance of XSLT processors when dealing with non-trivial or large transformations is a concern. Similarly, performance of a document management system may suffer when transforming a large XML source document. Compounding this problem, in current art, a transformation must be completely re-run whenever a change is made to the XML source document. This latter limitation of XML transformations stems from interdependencies which may exist between elements within the XML source data.

For example, consider an XSLT that creates an HTML ordered list by inspecting various markup elements and attribute values in a source XML document. If one of the elements or attributes from the source document is changed, the transformation would have to be re-run against the entire source XML to ensure that the resulting ordered list is correct. That is, if the transformation is ran only against the changed element or attribute, there would be no surrounding context to indicate where the new output should be inserted into the ordered list.

Accordingly, there remains a need in the art to improve the efficiency of XML transformations and XSLT processing. In particular, there remains a need for improved efficiency of XML transformations performed against a source document which has incurred minor or incremental changes.

SUMMARY OF THE INVENTION

Embodiments of the invention include a method of managing documents in a document management system (DMS). The method generally includes receiving a request to apply a document transformation to a source document managed by the DMS, wherein the document transformation specifies a set of rules to transform the source document into a result document and identifying a constituent set of document fragments in the source document. The method also includes, upon determining that one of the document fragments, from the set of document fragments, has been modified since a last time the document transformation was applied to the source document, applying the document transformation to only the modified fragment to generate a transformed result fragment and storing the transformed result fragment in a result fragment cache.

Embodiments of the invention also include a computer-readable storage medium containing a program which, when executed, performs an operation for managing documents in a document management system (DMS). The operation may generally includes receiving a request to apply a document transformation to a source document managed by the DMS, wherein the document transformation specifies a set of rules to transform the source document into a result document, and identifying a constituent set of document fragments in the source document. The operation also includes, upon determining that one of the document fragments, from the set of document fragments, has been modified since a last time the document transformation was applied to the source document; applying the document transformation to only the modified fragment to generate a transformed result fragment and storing the transformed result fragment in a result fragment cache.

Embodiments of the invention also include a system having a processor and a memory containing a document management system (DMS) program. When executed by the processor, the DMS program may be configured to perform an operation for managing documents in the DMS. The operation may generally include receiving a request to apply a document transformation to a source document managed by the DMS, wherein the document transformation specifies a set of rules to transform the source document into a result document and identifying a constituent set of document fragments in the source document. The operation also includes, upon determining that one of the document fragments, from the set of document fragments, has been modified since a last time the document transformation was applied to the source document; applying the document transformation to only the modified fragment to generate a transformed result fragment and storing the transformed result fragment in a result fragment cache.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 illustrates a fragment link table containing links between source fragments, transform rules, and result fragments, according to one embodiment of the invention.

DETAILED DESCRIPTION OF THE PREFERRED EMBODIMENTS

Figure 1:
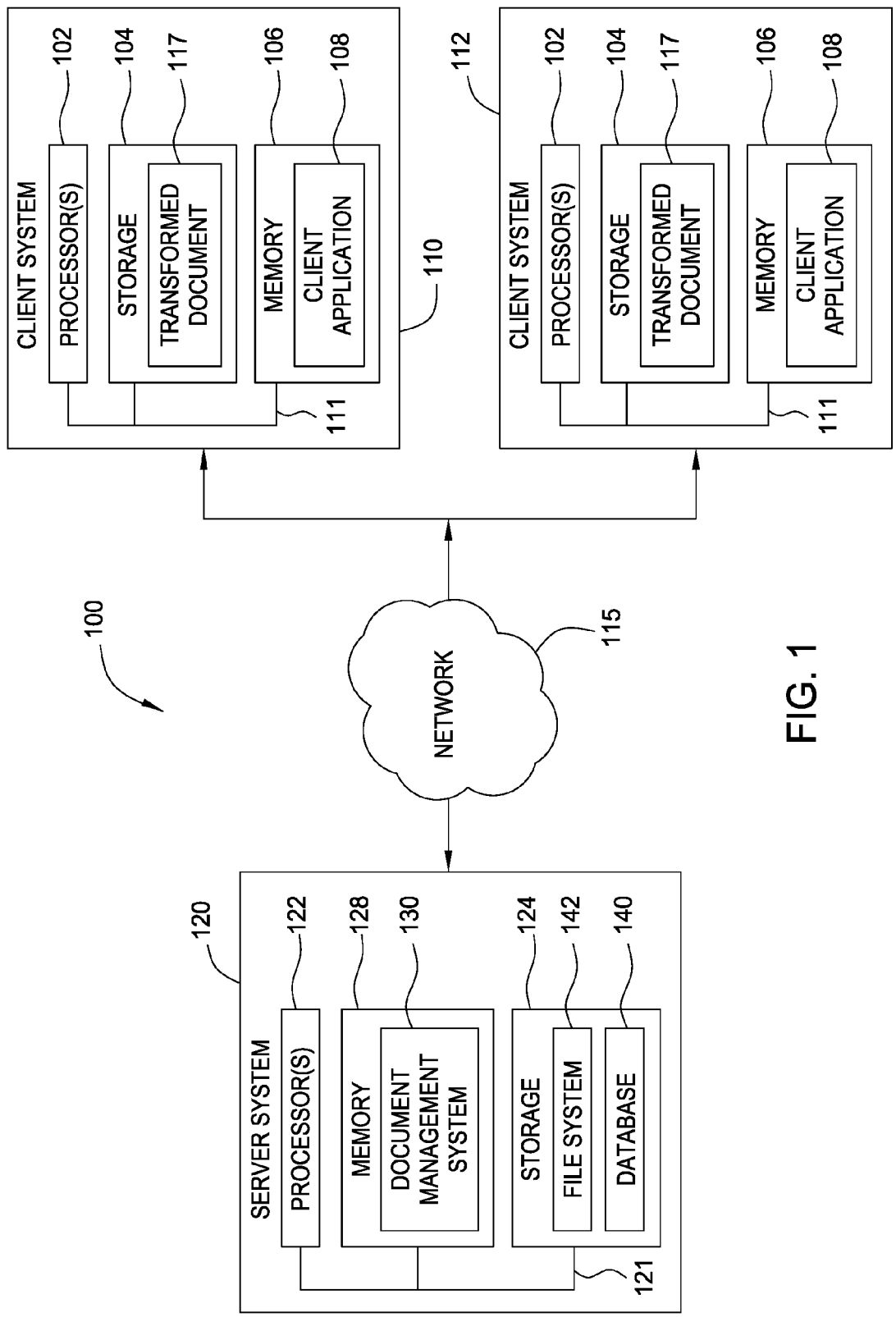
FIG. 1 is a block diagram illustrating a computing environment and document management system (DMS), according to one embodiment of the invention.

Embodiments of the invention provide for more efficient XML transformations, in particular transformations performed against a source document that has incurred minor or incremental changes. Rather than apply a transform to a complete document each time any fragment of the source document is modified, a document management system may be configured to apply the transform selectively, i.e., only to the modified portions of the document.

When a user seeks to access a document in a document management system (DMS), the actual document may not exist within the DMS. Rather, the document the user seeks may be an XSLT transformed version of an XML source document stored within the DMS. Accordingly, when the user attempts to access the transformed result document, the DMS may be configured to use an XSLT to transform the XML source document into the result document. To avoid duplicative transformations, the result document may be cached within the DMS so that the next time a user seeks the result document, the cached document may be accessed without having to again transform the XML source document. However, as described above, if the XML source document is modified in any way, the cached result document may no longer be an accurate representation of the XML source document. Thus, if the user later seeks the transformed result of the modified source document, the entire transformation must be performed again. In the event that the XML source document or XSLT transformation is large or complex, transformation of the XML source document may be computationally burdensome upon the operation of the DMS.

In one embodiment, to improve the efficiency of such transformations, the DMS may parse the XML source documents, XSLT transformations, and result documents to generate multiple fragments, each containing part of the source document, transformation, or of the result document. There are numerous XML-aware content management systems currently available which are configured to manage an XML document as a collection of constituent fragments. In one embodiment, tags within the XML source documents, XSLT transformations, and result documents may provide the fragment structure.

Alternatively, the DMS may store the fragments as separate documents. The DMS may manage the fragmented documents by forming links between source fragments, transformation fragments (also called rules), and result fragments. Utilizing such links, when a user attempts to access a result document, the DMS may be configured to build only result fragments linked to source fragments which have been modified since the XML source document was last transformed, as is described in more detail below. By transforming portions of the XML source document which have been modified, and not the entire XML source document, the transformation efficiency of the DMS may be improved.

While the foregoing describes the present invention in terms of a DMS, the principles and concepts of the present invention can be adapted to other systems. For example, a DMS may represent a web-server configured to generate and serve-up webpage documents. The web-server may retrieve an XML document from a database, transform the document with a PHP processor, and send a user the transformed content which is viewable with an internet browser. Similarly, the DMS may represent a content management system which allows users to create, access, and modify documents stored in the system.

The commercially available DMS, Solution for Compliance in a Regulated Environment (SCORE), developed by IBM is one example of a content management system which may significantly benefit from the techniques for improving XML transformation performance via incremental fragment transformations described herein. For example, SCORE uses a large XML configuration document to maintain menu configuration for its user interface. When the user interface needs to display a menu, the XML configuration file is transformed into a HTML document. Often, when the menu is accessed, only a single attribute in the menu XML has changed (e.g. an attribute value has changed from "display" to "hide"), yet the entire configuration file must be transformed anew. These types of operations typically occur many times during each user session. With the incremental transformation approach outlined herein, performance of such a system may be improved significantly. Of course, other applications of the incremental fragment transformations described herein will readily occur to one of ordinary skill in the art.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Further, embodiments of the invention are described herein adapted for use with the widely used XML markup language. Accordingly, references to data objects, documents, and XML documents generally refers to data marked up using a well-formed collection of XML tags, elements and/or attributes. As is known, an XML document may be used to describe virtually any type of data. For example, XML grammars have been used to describe word processing documents, spreadsheets, database records, digital images and digital video, to name but a few. Further, specialized grammars are frequently specified by a domain specific XML schema (e.g., the eCTD specification). A given XML document may also be associated with additional artifacts such as a document type definition (DTD), XSLT transforms XSL style sheets, and other associated files, tools and utilities. However, the invention is not limited to the XML markup language, XML schemas, and the use of XML documents; rather, embodiments of the invention may be adapted to other markup languages or other data object formats or data representations, whether now known or later developed.

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Document Management System

FIG. 1 is a block diagram that illustrates a client/server view of a computing environment 100, according to one embodiment of the invention. As shown, computing environment 100 includes two client computer systems 110 and 112 communicating with a server system 120 over a network 115. The computer systems 110, 112, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer systems 110, 112, and 120 are simplified to highlight aspects of the present invention and that computing systems and networks typically include a variety of additional elements not shown in FIG. 1.

As shown, client computer systems 110 and 112 each include a CPU 102, storage 104, and memory 106 connected by a bus 111. CPU 102 is a programmable logic device that performs all the instructions, logic, and mathematical processing performed in executing user applications (e.g., a client application 108). Storage 104 stores application programs and data for use by client computer systems 110 and 112. Typical storage devices 104 include hard-disk drives, flash memory devices, optical media and the like. Additionally, the processing activity and access to hardware resources made by client application 108 may be coordinated by an operating system (not shown). Well known examples of operating systems include the Windows® operating system, distributions of the Linux® operating system, and IBM's OS/2® operating system, among others. (Linux is a trademark of Linus Torvalds in the US, other countries, or both). Network 115 represents any kind of data communications network, including both wired and wireless networks. Accordingly, network 115 is representative of both local and wide area networks, including the Internet.

Illustratively, memory 106 of client computer systems 110 and 112 includes a client application 108. In one embodiment, client application 108 is a software application that allows users to access documents stored by a document management system (DMS) 130. Thus, client application 108 may be configured to allow users access to documents, (e.g., web-pages, PDF files, or text-documents generated by transforming an XML document with an XSLT, collectively referred to as "documents") from DMS 130. Accordingly, in a particular case, client application 108 is a web-browser capable of rendering an HTML document generated from an XML source document and the appropriate XSLT transform. Client application 108 may be configured to receive a document 117 from DMS 130 and store it in storage 104 while it is being accessed by client application 108. As shown, for example, storage 104 includes transformed document 117 which results from the application of an XSLT transform to a source document managed by DMS 130.

Server system 120 also includes a CPU 122, DMS storage repository 124, and a memory 126 connected by a bus 121. DMS repository 124 may include a database 140 and file system 142. File system 142 typically provides access to a directory structure contained on a disk drive or network file system and may be used to store files (e.g., documents, XML fragments, and configuration sets managed by DMS 130). Database 140 may contain additional information and metadata related to documents stored in file system 142. Memory 126 of server system 120 includes DMS 130. DMS 130 provides an application program configured for creating, modifying, archiving, transforming, and removing content managed by DMS 130. Thus, DMS 130 may include tools used for publishing, format management, revision and/or access control, content indexing, and facilities for performing searches and other operations related to documents managed by DMS 130.

Document Transformation

Figure 2:
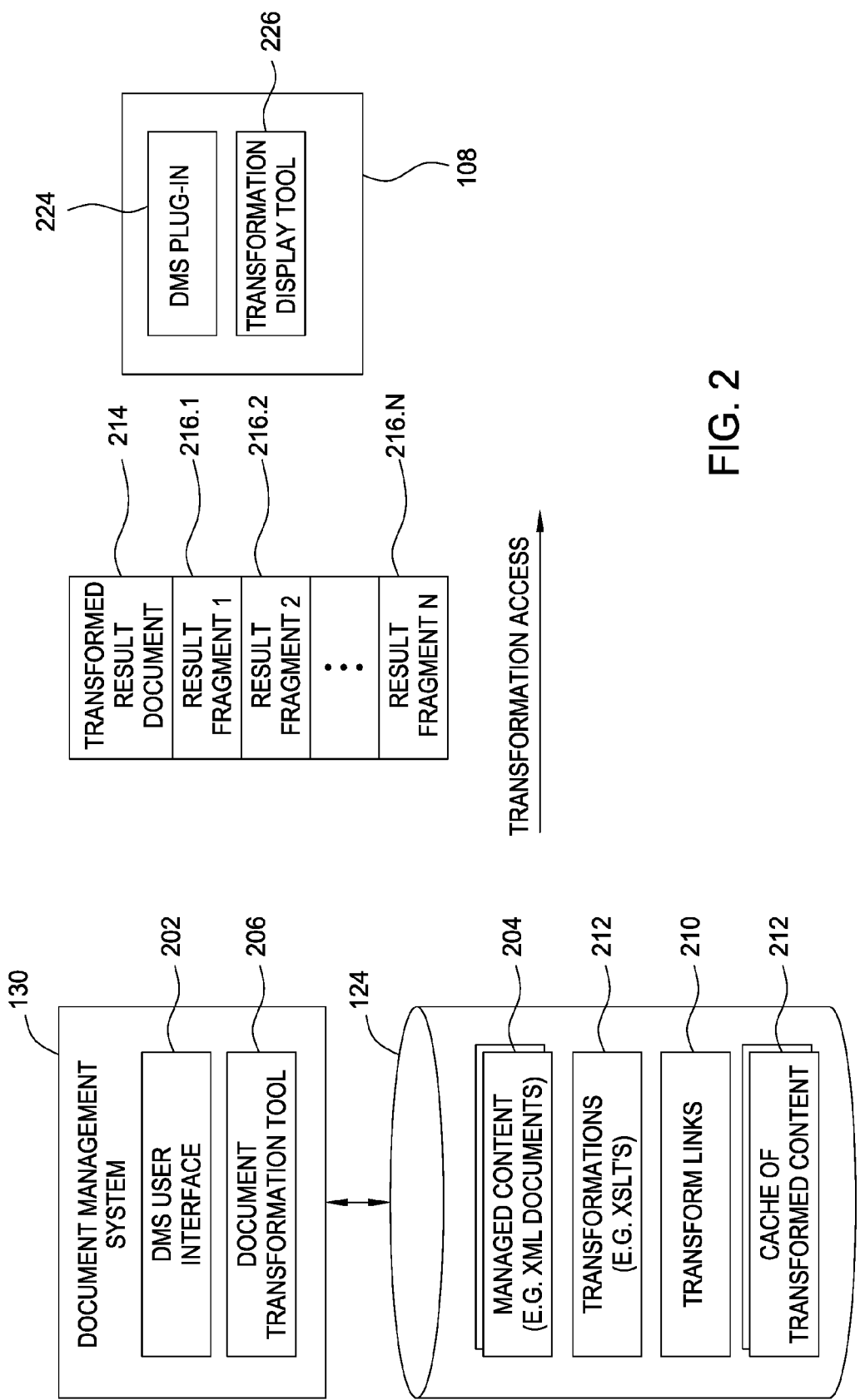
FIG. 2 is a conceptual illustration of a client application accessing transformed content managed by a DMS, according to one embodiment of the invention.

FIG. 2 is a conceptual illustration of client application 108 accessing a document managed by DMS 130, according to one embodiment of the invention. As shown, DMS 130 includes a DMS user interface 202 and a document transformation tool 206. Those skilled in the art will recognize that the DMS 130 illustrated in FIG. 2 is simplified to highlight aspects of the present invention and that DMS systems typically include a variety of additional elements not shown in FIG. 2.

Generally, user interface 202 provides an interface to the functionality of DMS 130 and managed content 204 stored by database 140 and file system 142. Thus, user interface 202 may provide an interface for accessing a document from DMS 130, for creating, viewing, and exporting documents from DMS 130 etc. Additionally, user interface 202 may allow a user to initiate the transformation of an XML source document and the viewing of the transformed result document. In one embodiment, the user interface 202 may provide the user an option to transform an entire XML source document, or to transform only a portion of the source document.

Document transformation tool 206 represents a component of DMS 130 configured to transform an XML source document (e.g. managed content 204) into a result document 214 according to a specified document transformation 208 (e.g. an XSLT transform and related stylesheet, if any). Although shown as part of DMS 130, in an alternative embodiment, document transformation tool 206 may run on a client system, such as client system 110 or 112.

In one embodiment, document transformation tool 206 may be configured to determine which fragments of an XML source document 204 have been modified since the source document was last transformed. In the example shown in FIG. 2, the document transformation tool 206 can determine whether any result fragments 216.1-216.N of the result document 214 have been modified by a user. Further, the document transformation tool 206 may update the affected result fragments 216.1-216.N by transforming source fragments linked to the affected result fragments 216.1-216.N, rather than transforming the entire XML source document. The source and result fragment may be linked as identified by transformation links 210 stored in DMS storage repository 124. The document transformation tool 206 may produce an updated transformation result document by combining the updated result fragments with previously created result fragments not affected by the modification to the source XML document. The DMS 130 may then send the updated result document to client application 108.

In one embodiment, document transformation tool 206 may be configured to cache (or otherwise store), result documents 214 and result fragments 216.1-216.N as part of transformed content 212 within the DMS 130. Alternatively, the cache of transformed content 212 may be stored in storage 104 of a particular client system, such as client system 110 or 112.

As shown, client application 108 includes a DMS plug-in 224 and a transformation display tool 226. DMS plug-in 224 allows client application 108 to interact with DMS 130 and DMS user interface 202. For example, plug-in 224 may allow a user interacting with client application 108 to request a result document 214 from DMS 130. Transformation display tool 226 may provide the substantive features associated with particular client application 108. For example, an internet web-browser may be used to render, view, and edit transformed result document 214. Of course, depending on the function of client application 108, the features provided by the transformation display tool 226 may be tailored to suit the needs of an individual case.

Exemplary Transformation

Figure 3:
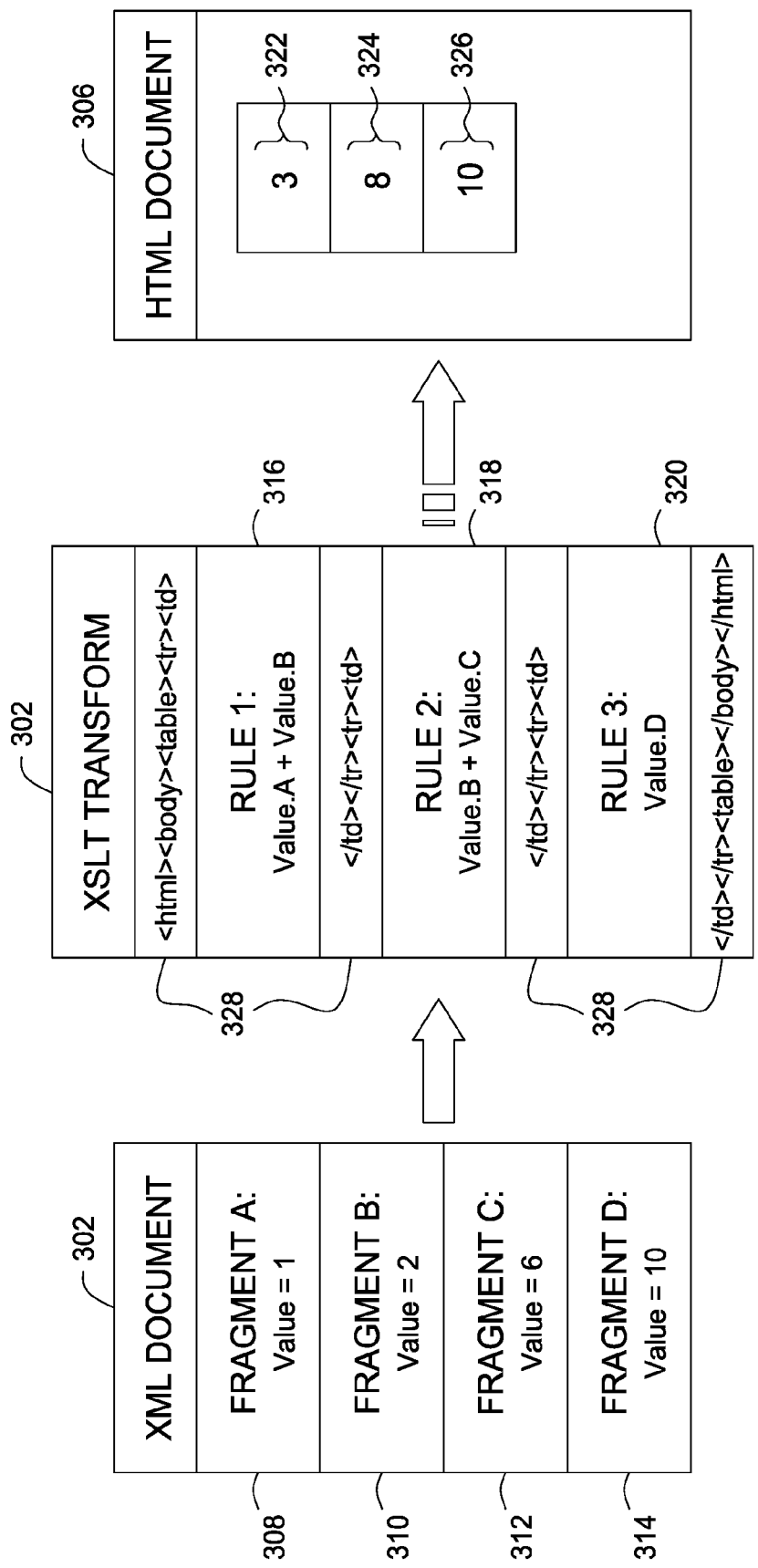
FIG. 3 illustrates a source document, a related transform, and a result document, according to one embodiment of the invention.

FIG. 3 illustrates an XML document 302, a related XSLT transform 304, and an HTML document 306 generated from XML document 302 and XSLT transform 304, according to one embodiment of the invention. XML document 302 may be a source document stored as managed content 204 within DMS storage repository 124. Similarly, XSLT transform 304 may be one of the transformations 208 and HTML document 306 may be a result document 214 associated with XSLT transformation 304. As shown, the XML document 302, XSLT transform 304, and HTML document 306 may be parsed into a set of constituent fragments.

Illustratively, XML document 302 includes a "Fragment A" 308, a "Fragment B" 310, a "Fragment C" 312, and a "Fragment D" 314. XSLT transform 304 also includes a set of transformation rules, in this case, "Rule 1" 316, "Rule 2" 318, "Rule 3" 320, and a document structure 328. The transformation rules 316, 318, 320 and document structure 328 are used by an XSLT processor application to transform XML document 302 into HTML document 306. For example, if "Fragment A" contained an element whose value was "1" and "Fragment B" contained an element whose value was "2," "Rule 1" would produce a result fragment 322 with a value of "3." Further, if "Fragment C" contained an element whose value was "6," "Rule 2" would produce a result fragment 324 whose value was "8." Similarly, if "Fragment D" contained an element whose value was "10," "Rule 3" would produce a result fragment 326 whose value was "10." Note, however, that rather than displaying the raw HTML code produced by such a transformation, HTML document 306 is a graphical representation of the transformation results as may be displayed by a web-browser. The actual HTML elements generated by transform 304 are shown as the HTML markup tags included in document structure 328.

In one embodiment, when the document transformation tool 206 transforms an entire XML source document (e.g. XML document 302) into a result document (e.g. HTML document 306), the document transformation tool 206 may fragment the result document and establish links between any given result fragment and the rule(s) and source fragment(s) that contributed to the creation of that fragment. FIG. 4 illustrates a fragment link table 400 which provides the links between the source fragments of XML document 302 and the result fragments of HTML document 306. For example, as is depicted in the fragment link table 400, "Result 1", which is produced by "Rule 1," is linked to "Fragment A."

In one embodiment, were "Fragment A" of XML document 302 is modified, then the next time a user requests access to this document (i.e., requests result document 306), transformation tool 206 may be configured to detect that "Fragment A" has been modified. The document transformation tool 206 may then analyze the links for XML document 302 and determine that "Result 1" was linked to "Fragment A". Document transformation tool 206 may then locate any other fragments associated with "Result 1" (e.g. "Fragment B"), build a source tree of "Fragment A" and "Fragment B", perform the transformation defined in "Rule 1", and update "Result 1" and HTML document 306. At the same time, however, because "Result 2" and "Result 3" are not dependent upon "Rule 1," neither of these fragments are re-transformed, as no update processing is required.

In an alternative embodiment, document transformation tool 206 may generate a document that includes the source fragment(s) needed to update any result fragment(s) linked to a modified source fragment. For example, were "Fragment A" modified, the document transformation tool 206 may build a shell document containing "Fragment A" and "Fragment B" since both are associated with "Result 1". The document transformation tool 206 may then add any other information to the shell document necessary for transformation. Then, the document transformation tool 206 may perform a full transformation, as defined by an XSLT transform (e.g. XSLT transform 304), and may extract only the relevant result fragments. In the example above, the shell document would not contain "Fragment C" or "Fragment D". That is, "Result 2" and "Result 3" from the transformation are effectively ignored, and only "Result 1" would be stored in the cache of transformed content 212 in DMS storage repository 124.

There are numerous techniques that document transformation tool 206 may use to determine whether a source fragment has been modified since a previous transformation. For example, a source fragment may include a timestamp indicating the last time that fragment was modified. Alternatively, a source fragment may simply contain a flag which provides an indication of whether the source fragment has been modified since the previous transformation. One skilled in the art will recognize that there are numerous other schemes for determining whether a source fragment has been modified since its last transformation. The schemes described above are meant to be exemplary, and all schemes which can be used to determine whether a source fragment has been modified are herein contemplated.

Initial Transformation of Source Document

There are numerous scenarios where it may be appropriate to transform an entire XML source document rather than a subset of the document. For example, if the XML source document has never been transformed in the context of a certain XSLT transformation, result fragments may not exist in the cache of transformed content 212 in the DMS storage repository 124. Therefore, a full transform of the source document may be necessary. Alternatively, if an XSLT stylesheet has been modified, a complete transformation of the source document may be required. Further, a user may have the option when accessing a result document to completely re-create the result document from its XML source document rather than accessing a cached or updated version of the result document. Further still, the DMS 130 may contain rules configured to trigger the entire transformation of the XML source document upon the occurrence of a defined event. For example, if a certain time has elapsed since the source document was last transformed, then the document transformation tool 206 may perform a full transformation of the XML source document. One skilled in the art will recognize that there are numerous other factors which might affect whether a whole or partial XML source document should be transformed, and all such factors are herein contemplated.

Figure 5:
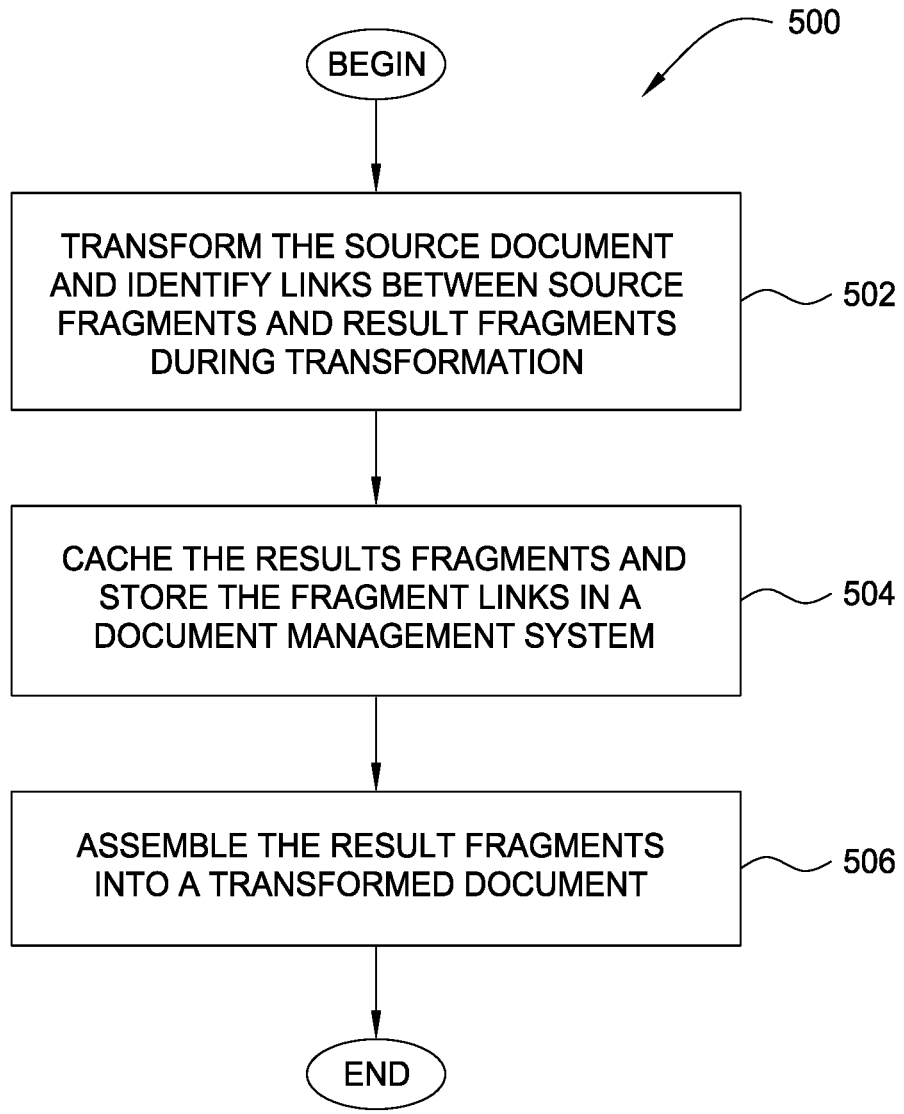
FIG. 5 is a flow diagram illustrating a method for transforming an entire source document, according to one embodiment of the invention.

FIG. 5 is a flow diagram illustrating a method for transforming an entire source document, according to one embodiment of the invention. Process 500 begins at step 502, where the document transformation tool 206 within the DMS 130 transforms the XML source document and creates a result document and/or result fragments. Additionally, document transformation tool 206 may identify links between a source fragment (or fragments) and a result fragment (or fragments) so that, as described, partial transformations may subsequently be performed.

At step 504, the DMS 130 may cache the result fragments in the cache of transformed content 212. Additionally, the DMS 130 may store the links generated in step 502 as transform links 210 in DMS storage repository 124. In one embodiment, the assembled result document may also be stored within the DMS 130. Alternatively, a framework for the document may be stored in the DMS 130 and the result document may be assembled when a user requests the result document.

At step 506, the result fragments generated in step 502 may be assembled into a result document. The result document may subsequently be sent to a user, as is described below.

Process for Accessing a Result Document

Figure 6:
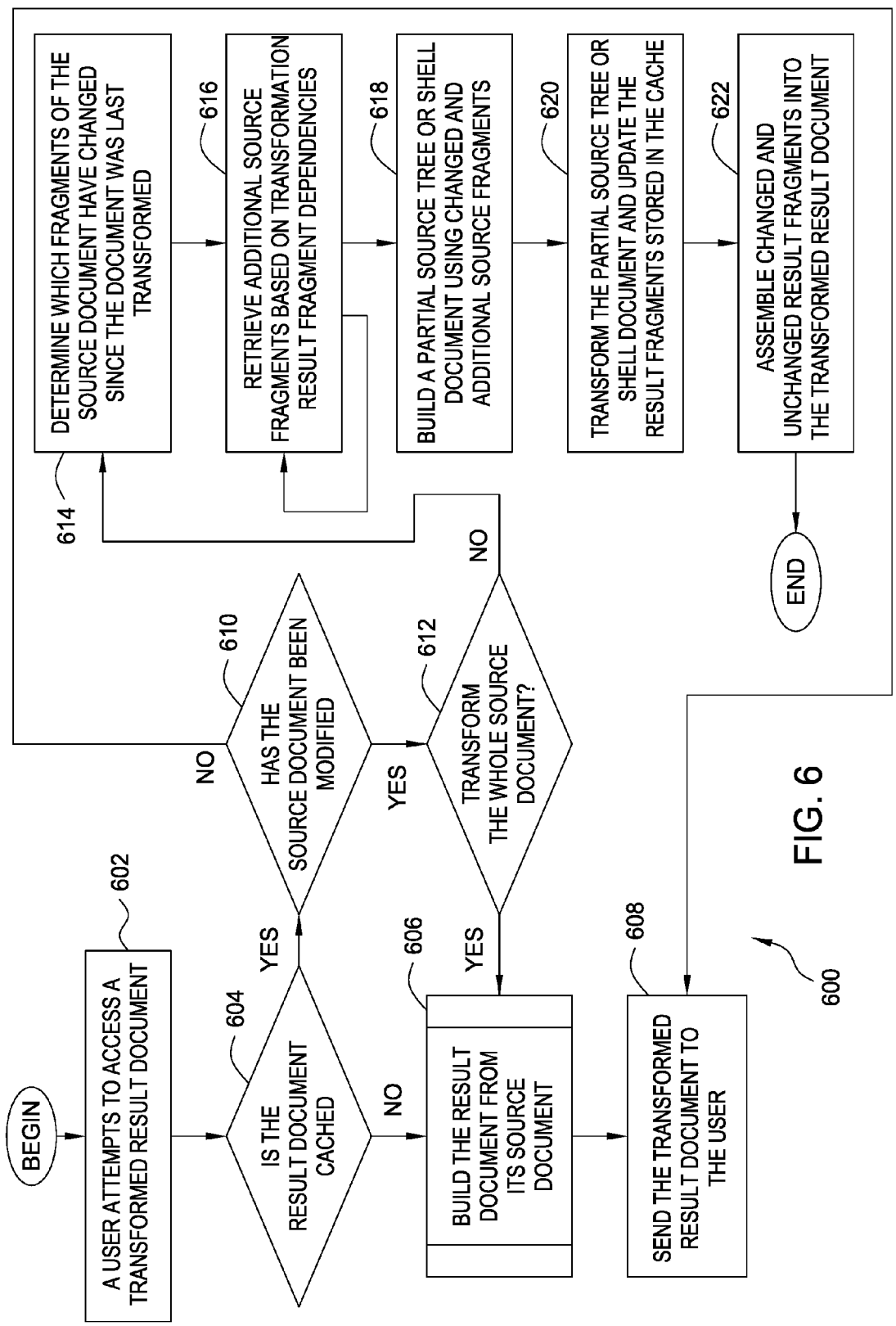
FIG. 6 is a flow diagram illustrating a document transformation process, according to one embodiment of the invention.

FIG. 6 is a flow diagram illustrating a document transformation process, according to one embodiment of the invention. Process 600 begins at step 602, when a user accesses (or requests access to) a document which is the result of an XSLT transformation applied to an XML source document.

At step 604, a DMS 130 determines if the result document is cached in the DMS 130 (e.g. in a cache of transformed content 212 in DMS storage repository 124). If the document is not present in a cache, process 600 proceeds to step 606, where, as described above with reference to FIG. 5, the XML source document is transformed into the result document and links are formed between result fragments and source fragments. From step 606, process 600 proceeds to step 608, where the transformed result document is sent to the user.

If, however, there is a cached version of the result document stored in the DMS 130, then at step 610, where the cached result document and its associated XML source document are analyzed to determine if the source document has been modified since its last transformation. If the XML source document has not been modified, then at step 608 where, the cached result document is sent to the user, as described above.

Otherwise, if the source document has been modified, process 600 proceeds to step 612. At step 612 the DMS determines whether or not the entire XML source document needs to be transformed. As described above, many factors may be evaluated to determine whether a complete transformation of the XML source document is needed. For instance, rules within the DMS 130 could specify situations where the document transformation tool 206 should transform the entire source document rather than just fragments needed to produce the updated result document (e.g. percentage of modified fragments, date last transformed, etc.). If the DMS 130 determines that the entire XML source document needs to be transformed, then at step 606, where the complete source document is transformed, as described above.

Otherwise, if only a portion of the XML source document needs to be transformed to update the result document, process 600 proceeds to step 614. At step 614, the document transformation tool 206 may determine which fragments of the XML source document have changed since the document was last transformed. Possible schemes for locating modified source fragments are described above and include analyzing a transformation status flag within the source fragment.

At step 616, the document transformation tool 206 may analyze transformation links between modified source fragments and result fragments to determine which result fragment(s) are affected by the modifications to the source fragments. The document transformation tool 206 may further analyze the transformation links to determine which XML source fragments are needed to update the affected result fragments. As described above, the transformation links may be established when the entire XML source document was transformed, as shown in FIG. 5. Once the document transformation tool 206 has determined which XML source fragments need to be updated in the result document, the document transformation tool 206 retrieves those XML source fragments.

At step 618, the document transformation tool 206 may combine the retrieved source fragments into a shell document or partial source tree, as described above. The shell document or partial source tree may contain information needed to produce updates to the result fragments affected by the modification to the XML source document.

At step 620, the shell document or partial source tree is transformed to produce one or more result fragments. The document transformation tool 206 updates the cache of transformed content 212 with the newly generated result fragments. At step 622, the document transformation tool may assemble the modified and original result fragments into an updated result document. Thus, an updated result document may be produced from a modified XML source document without requiring the transformation of the entire source document. Lastly, at step 608, as described above, the document transformation tool 206 may send the user the requested result document.

Process 600 is exemplary, and one skilled in the art will recognize that there are numerous similar processes which will achieve the same result, namely improved transformation efficiency through incremental fragment transformation. Such similar processes are also herein contemplated.

Advantageously, embodiments of the invention provide for more efficient XML transformations, in particular transformations performed against a source document that has incurred minor or incremental changes. Rather than apply a transform to a complete document each time any fragment of the source document is modified, a document management system may be configured to apply the transform only to the modified portions of the document.

While the foregoing is directed to embodiments of the present invention, other and further embodiments of the invention may be devised without departing from the basic scope thereof, and the scope thereof is determined by the claims that follow.

What is claimed is:

1. A computer-implemented method of keeping result documents, transformed from source documents, current when the source documents are modified, the computer-implemented method comprising:
subsequent to receiving a source document by a document management system (DMS): (i) fragmenting the source document into a constituent set of document fragments and (ii) applying the document transformation to the set of document fragments in order to generate a set of result fragments;
generating a fragment link table based on a set of links established between: (i) each document fragment of the constituent set of document fragments and (ii) a corresponding result fragment of the set of result fragments; wherein the document transformation specifies a set of rules to transform the source document into a result document;
subsequent to generating the fragment link table, and responsive to receiving a request to apply the document transformation to the source document, identifying the constituent set of document fragments generated from the source document, wherein each source fragment is associated with one or more rules of the set of rules for transforming the source document into the result document, wherein each of the constituent set of document fragments is stored in the DMS as a distinct document used to build the source document;
determining that one of the document fragments, from the set of document fragments generated from the source document, has been modified since a last time the document transformation was applied to the source document, including: (i) evaluating a timestamp associated with the constituent set of document fragments and (ii) analyzing a transformation status flag associated with the constituent set of document fragments;
generating a source tree of at least the one document fragment; and
upon detecting occurrence of an event for performing a partial transformation, applying the one or more rules of the set of rules associated with the modified document fragment and by the DMS when executed by one or more computer processors, to the source tree in order to generate a transformed result fragment, wherein the event is defined by the one or more rules, wherein the transformed result fragment is stored in a result fragment cache.

2. The computer-implemented method of claim 1, further comprising:
assembling the transformed result fragment and a set of unmodified result fragments in order to form the result document without transforming the entirety of the source document having the modified document fragment; and
returning the result document in response to the request;
wherein the DMS includes a capability of, upon detecting occurrence of an event for performing a full transformation, transforming the entirety of the source document having the modified document fragment, into the result document without generating any transformed result fragments.

3. The computer-implemented method of claim 2, wherein the event for performing the full transformation comprises, in different instances: (i) a date last transformed; (ii) a percentage of modified fragments; and (iii) a user specifying to perform the full transformation.

4. The computer-implemented method of claim 3, wherein the DMS is operatively connected to a client application, the client application comprising a plurality of components including a DMS plug-in and a transformation display tool, wherein the DMS plug-in permits the client application to interact with the DMS, wherein the transformation display tool renders the result document.

5. The computer-implemented method of claim 4, wherein the source document is an Extensible Markup Language (XML) document, wherein the document transformation is an Extensible Stylesheet Language Transformations (XSLT) transformation, wherein each of the constituent set of document fragments is a partial source tree of the XML document, wherein the XSLT transformation is used to generate an HTML document from the XML document.

6. The computer-implemented method of claim 1, further comprising:
establishing a set of links between each document fragment and corresponding result fragment, wherein the links identify the one or more rules of the set of rules associated with each document fragment; and
storing the set of result fragments in the result fragment cache.

7. The computer-implemented method of claim 1, further comprising:
establishing a set of links between each document fragment and corresponding result fragment, wherein the links identify the one or more rules of the set of rules associated with each document fragment.

8. The computer-implemented method of claim 1, wherein the XSLT transformation is based on an XSLT stylesheet, wherein the transformation display tool comprises a web browser that renders the HTML document.

9. The computer-implemented method of claim 1, wherein the source document is an Extensible Markup Language (XML) document, wherein the document transformation is an Extensible Stylesheet Language Transformations (XSLT) transformation, wherein each of the constituent set of document fragments is a partial source tree of the XML document, wherein the XSLT transformation is used to generate an HTML document from the XML document.

10. A non-transitory computer-readable medium containing a program comprising a document management system (DMS) executable to perform an operation of keeping result documents, transformed from source documents, current when the source documents are modified, the operation comprising:
subsequent to receiving a source document by a document management system (DMS): (i) fragmenting the source document into a constituent set of document fragments and (ii) applying the document transformation to the set of document fragments in order to generate a set of result fragments;
generating a fragment link table based on a set of links established between: (i) each document fragment of the constituent set of document fragments of the set of result fragments and (ii) a corresponding result fragment; wherein the document transformation specifies a set of rules to transform the source document into a result document;
subsequent to generating the fragment link table, and responsive to receiving a request to apply the document transformation to the source document, identifying the constituent set of document fragments generated from the source document, wherein each source fragment is associated with one or more rules of the set of rules for transforming the source document into the result document, wherein each of the constituent set of document fragments is stored in the DMS as a distinct document used to build the source document;
determining that one of the document fragments, from the set of document fragments generated from the source document, has been modified since a last time the document transformation was applied to the source document, including: (i) evaluating a timestamp associated with the constituent set of document fragments and (ii) analyzing a transformation status flag associated with the constituent set of document fragments;
generating a source tree of at least the one document fragment; and
upon detecting occurrence of an event for performing a partial transformation, applying the one or more rules of the set of rules associated with the modified document fragment and by the DMS when executed by one or more computer processors, to the source tree in order to generate a transformed result fragment, wherein the event is defined by the one or more rules, wherein the transformed result fragment is stored in a result fragment cache.

11. The non-transitory computer-readable medium of claim 10, wherein the operation further comprises:
assembling the transformed result fragment and a set of unmodified result fragments in order to form the result document without transforming the entirety of the source document having the modified document fragment; and
returning the result document in response to the request;
wherein the DMS includes a capability of, upon detecting occurrence of an event for performing a full transformation, transforming the entirety of the source document having the modified document fragment, into the result document without generating any transformed result fragments.

12. The non-transitory computer-readable medium of claim 10, wherein the operation further comprises:
establishing a set of links between each document fragment and corresponding result fragment, wherein the links identify the one or more rules of the set of rules associated with each document fragment; and
storing the set of result fragments in the result fragment cache.

13. The non-transitory computer-readable medium of claim 10, wherein the operation further comprises:
establishing a set of links between each document fragment and corresponding result fragment, wherein the links identify the one or more rules of the set of rules associated with each document fragment.

14. The non-transitory computer-readable medium of claim 10, wherein the XSLT transformation is based on an XSLT stylesheet, wherein the transformation display tool comprises a web browser that renders the HTML document.

15. The non-transitory computer-readable medium of claim 10, wherein the source document is an Extensible Markup Language (XML) document, wherein the document transformation is an Extensible Stylesheet Language Transformations (XSLT) transformation, wherein each of the constituent set of document fragments is a partial source tree of the XML document, wherein the XSLT transformation is used to generate an HTML document from the XML document.

16. A system of keeping result documents, transformed from source documents, current when the source documents are modified, the system comprising:
one or more computer processors; and
a memory containing a program associated with a document management system (DMS) and which, when executed by the one or more computer processors, performs an operation for managing documents in the DMS, the operation comprising:
subsequent to receiving a source document by the DMS: (i) fragmenting the source document into a constituent set of document fragments and (ii) applying the document transformation to the set of document fragments in order to generate a set of result fragments;
generating a fragment link table based on a set of links established between: (i) each document fragment of the constituent set of document fragments and (ii) a corresponding result fragment of the set of result fragments; wherein the document transformation specifies a set of rules to transform the source document into a result document;
subsequent to generating the fragment link table, and responsive to receiving a request to apply the document transformation to the source document, identifying the constituent set of document fragments generated from the source document, wherein each source fragment is associated with one or more rules of the set of rules for transforming the source document into the result document, wherein each of the constituent set of document fragments is stored in the DMS as a distinct document used to build the source document;

determining that one of the document fragments, from the set of document fragments generated from the source document, has been modified since a last time the document transformation was applied to the source document, including: (i) evaluating a timestamp associated with the constituent set of document fragments and (ii) analyzing a transformation status flag associated with the constituent set of document fragments;

generating a source tree of at least the one document fragment; and upon detecting occurrence of an event for performing a partial transformation, applying the one or more rules of the set of rules associated with the modified document fragment, to the source tree in order to generate a transformed result fragment, wherein the event is defined by the one or more rules, wherein the transformed result fragment is stored in a result fragment cache.

17. The system of claim 16, wherein the operation further comprises:

assembling the transformed result fragment and a set of unmodified result fragments in order to form the result document without transforming the entirety of the source document having the modified document fragment; and returning the result document in response to the request;

wherein the DMS & includes a capability of, upon detecting occurrence of an event for performing a full transformation, transforming the entirety of the source document having the modified document fragment, into the result document without generating any transformed result fragments.

18. The system of claim 16, wherein the operation further comprises:

establishing a set of links between each document fragment and corresponding result fragment, wherein the links identify the one or more rules of the set of rules associated with each document fragment; and storing the set of result fragments in the result fragment cache.

19. The system of claim 16, wherein the operation further comprises:

establishing a set of links between each document fragment and corresponding result fragment, wherein the links identify the one or more rules of the set of rules associated with each document fragment.

20. The system of claim 16, wherein the XSLT transformation is based on an XSLT stylesheet, wherein the transformation display tool comprises a web browser that renders the HTML document.

21. The system of claim 16, wherein the source document is an Extensible Markup Language (XML) document, wherein the document transformation is an Extensible Stylesheet Language Transformations (XSLT) transformation, wherein each of the constituent set of document fragments is a partial source tree of the XML document, wherein the XSLT transformation is used to generate an HTML document from the XML document.

* * * * *